United States Patent [19]

Nilsson

[11] Patent Number: 4,936,992
[45] Date of Patent: Jun. 26, 1990

[54] ARRANGEMENT OF ROTATING FILTERS FOR IMPROVED FILTRATE DISCHARGE

[76] Inventor: Bjarne Nilsson, Lanterngatan 9, S-462 00 Vänersborg, Sweden

[21] Appl. No.: 319,236
[22] PCT Filed: Jun. 22, 1988
[86] PCT No.: PCT/SE88/00350
  § 371 Date: Feb. 24, 1989
  § 102(e) Date: Feb. 24, 1989
[87] PCT Pub. No.: WO88/10145
  PCT Pub. Date: Dec. 29, 1988

[30] Foreign Application Priority Data
  Jun. 24, 1987 [SE] Sweden .................... 8702619

[51] Int. Cl.⁵ .................................... B01D 33/26
[52] U.S. Cl. ........................... 210/331; 210/346; 210/486
[58] Field of Search ............... 210/330, 331, 345, 346, 210/347, 359, 390, 461, 486, 487

[56] References Cited
U.S. PATENT DOCUMENTS

| | | | |
|---|---|---|---|
| 2,464,223 | 3/1949 | Genter | 210/486 |
| 4,056,473 | 11/1977 | Nilsson | 210/345 |
| 4,169,794 | 10/1979 | Badino | 210/347 |
| 4,634,529 | 1/1987 | Nilsson | 210/331 |
| 4,637,876 | 1/1987 | Dosoudil | 210/331 |
| 4,676,901 | 6/1987 | Ragnegard | 210/331 |
| 4,678,575 | 7/1987 | Frykhult | 210/331 |

Primary Examiner—Frank Spear
Assistant Examiner—Joseph Drodge
Attorney, Agent, or Firm—Pollock, Vande Sande & Priddy

[57] ABSTRACT

A disk filter, including a plurality of rotatable, axially spaced annular filter disks (6:1–6:11) adapted to be partially immersed in a liquid or a suspension which is to be filtered. Each filter disk comprises a plurality of filter elements 6:1a–f . . . 6:11a–f) which are in communication with axial filtrate conduits (2a–2l) arranged at the outer peripheries of the annular disks for discharge of filtrate. For increasing the flow speed of the filtrate in the axial filtrate conduits these slope downwards in the flow direction. This has been achieved in that a filter element (6:1a) of a filter disk (6:1b) is displaced relative to the filter element (6:2a) of the filter disk (6:2) connected to the same filtrate conduit (2a) and being the following filter disk, counted in the flow direction in the axial filtrate conduit, so that the first mentioned filter element is in advance of the later mentioned filter element, as counted in the direction of rotation.

2 Claims, 1 Drawing Sheet

ARRANGEMENT OF ROTATING FILTERS FOR IMPROVED FILTRATE DISCHARGE

FIELD OF THE INVENTION

The present invention relates to a disk filter including a plurality of rotatable, axially spaced annular filter disks adapted to be partially immersed in a liquid or a suspension to be filtered, each disk comprising a plurality of filter elements which are in communication with axial filtrate conduits arranged at the outer peripheries of the annular disks for discharge of filtrate.

BACKGROUND OF THE INVENTION

A filter of this kind is described in SE-C No. 8305817-2 and in corresponding EP-B1 No. 0160069 and U.S. Pat. No. 4 634 529. The axial filtrate conduits of this filter are produced with re-flow barriers for preventing so-called "backwash", i.e. re-wetting of a filter cake, such as dehydrated fibers, deposited on the filter elements, due to the filtrate from the filtrate conduits running back again to the filter elements.

SUMMARY OF THE INVENTION

The object of the present invention is to improve a filter of the kind discussed hereinabove so that the filtrate flow speed in its axial filtrate conduits is increased to a great extent. Possible re-flow barriers will thus be less essential or can be completely dispensed with.

BRIEF DESCRIPTION OF THE DRAWINGS

The invention will now be described with reference to the accompanying drawing, in which.

DESCRIPTION OF PREFERRED EMBODIMENT

Figure 1:
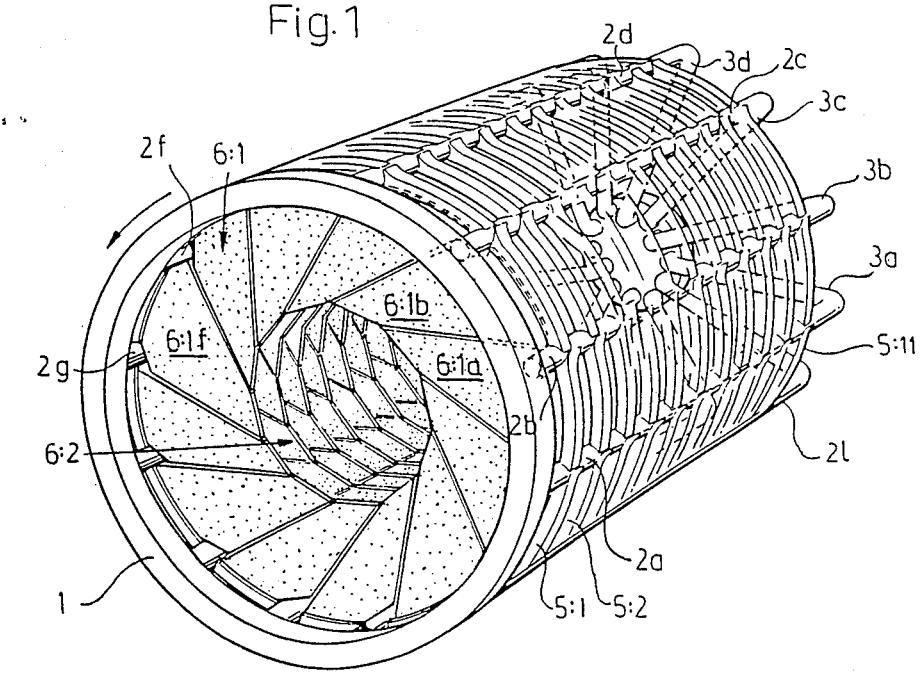
FIG. 1 is a perspective view of a filter rotor.

The filter rotor illustrated in FIG. 1 has at one end a ring 1 with a smooth circumference which is carried by roller bearings (not shown). From the ring 1 there extend substantially axial filtrate conduits 2a, 2b, 2c, etc. which are fastened in the ring and which, at the end of the rotor remote from the ring 1, merge into substantially radially directed filtrate conduits 3a, 3b, 3c, etc. These terminate in a valve means 4, through which the radial filtrate conduits and thereby the corresponding axial filtrate conduits are sequentially placed into communication with a suction discharge system for the filtrate. The axial filtrate conduits are connected by parallel annular filter disk holders 5:1, 5:2, 5:3 ... 5:11, which carry annular filter disks 6:1, 6:2, 6:3 ... 6:11. Each filter disk, e.g., the disk 6:1, comprises a plurality of filter elements 6:1a, 6:1b, etc., each of which has a filtrate outlet (not shown) in communication with an axial filtrate conduit via a filter disk holder. In the direction of rotation of the filter rotor indicated by arrow (A), a filter element, e.g., the element 6:1a, communicates vil the filter disk holder 5:1 solely with the succeeding axial filtrate conduit 2a, the filter element 6:1b only with the conduit 2b, etc.

Figure 2:
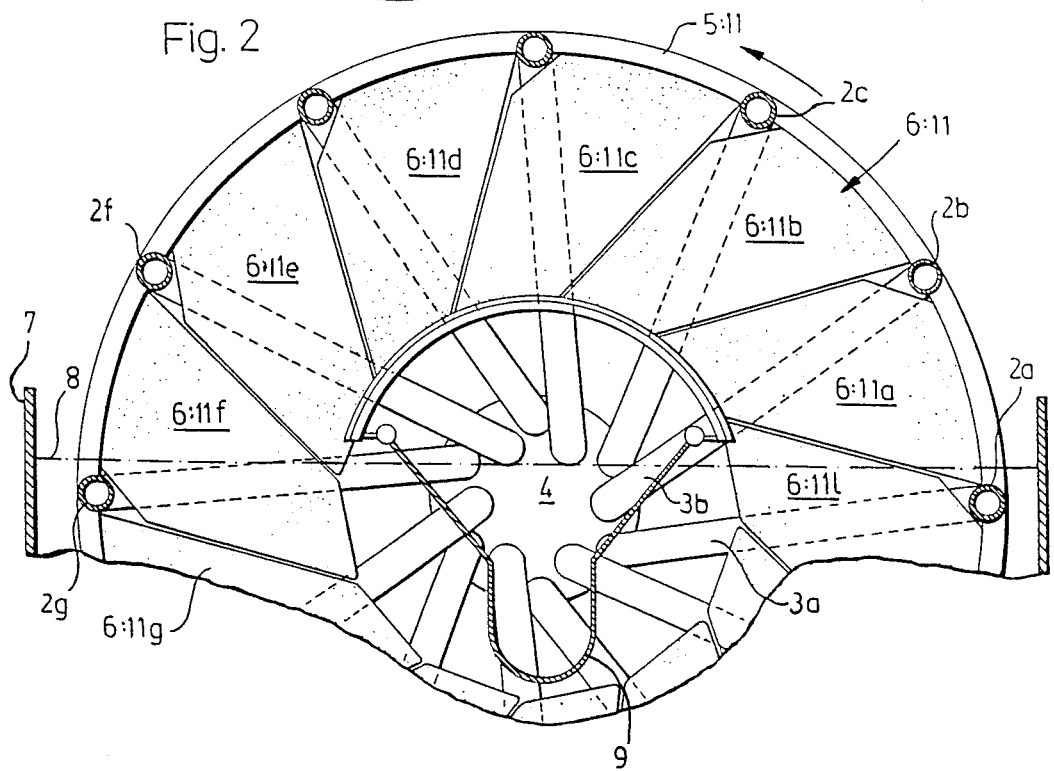
FIG. 2 is a section through the rotor on a larger scale, taken in a direction toward its outlet end.

FIG. 2 shows the filter rotor as being immersed in a vessel 7 containing a liquid to be filtered. The liquid surface is denoted by 8. A collection trough extends through all the filter disks. The valve means 4 is so arranged that the flow of filtrate toward it is maintained in each radial filtrate conduit and its associated axial filtrate conduit from the time that a filter element beginning when it is approximately in the position assumed by the filtrate conduit 2f and the element 6:11f shown in FIG. 2. This flow of filtrate is maintained approximately until the given filter element and associated filtrate conduit are in the position assumed by the filtrate conduit 2b and the element 6:11b.

It be important that the filtrate is rapidly led away around the positions assumed by the axial filtrate conduits 2a and 2b, so that it no longer remains in the conduits when these rise further, in order to prevent the risk of it running back again to the associated filter element, which could possibly take place from the conduit 2b to the element 6:11b as well as from the conduit 2c to the element 6:11c in FIG. 2. In accordance with the invention, therefore, the axial filtrate conduits slope towards the outlet end during the critical part of the time they convey the filtrate, namely, within the time just before and after they from the liquid surface (the region approximately between 4 and 12 o'clock in FIG. 2). This has been achieved by twisting the entire filter rotor such that, in the direction of rotation, a filter element such as the element 6:1a is somewhat in advance of the filter element of an adjacent filter disk 6:2 connected to the same axial filtrate conduit. Effective emptying of the axial filtrate conduits is accelerated by the slope towards the outlet end, this action being further increased by having the respective connecting radial filtrate conduits also sloping downwards towards the valve means 4 (see, for instance, the radial filtrate conduit 3b connected to the axial filtrate conduit 2b).

This twist of the filter rotor results in the further advantage that, when the filter elements are lowered below the liquid surface 8 in the vessel 7, the elements at the end remote from the outlet end are lowered before the elements closer to the outlet end. Accordingly, the sections connected to tha axial filtrate conduit 2f are lowered in the order 6:1f, 6:2f ... 6:11f. The axial filtrate conduit 2f thus slopes upwards towards the outlet end, with the result that any air in the conduit is successively pushed away by the filtrate in its progress towards the outlet end.

I claim:

1. A disk filter, including a plurality of rotatable, axially spaced annular filter disks adapted to be partially immersed in a liquid to be filtered, each of said filter disks comprising a plurality of filter elements, each of said filter elements having an outlet at its outer periphery communicating with an axial filtrate conduit extending along outer peripheries of said annular disks for consecutively receiving filtrate from adjacent filter elements in successive disks and discharging said filtrate in a flow direction towards an outlet of said disk filter, wherein the outlet of each given filter element of a given filter disk is circumferentially displaced relative to the outlet of a given filter element of the filter disk preceding, in said flow direction, said given filter disk, such that an axial filtrate conduit communicating with said given filter element outlets inclines in said flow direction at the time each given filter element outlet rises above a surface of said liquid.

2. A disk filter as claimed in claim 1, wherein said outlet of said filter is centrally located and each axial filtrate conduit is connected to a substantially radial filtrate conduit, each substantially radial filtrate conduit being eccentrically connected to said outlet of said filter, such that each axial filtrate conduit and an associated one of said substantially radial filtrate conduits define a filtrate discharge conduit continuously inclining in said flow direction towards said outlet of said filter.

* * * * *